US012528728B2

(12) United States Patent
Park et al.

(10) Patent No.: US 12,528,728 B2
(45) Date of Patent: Jan. 20, 2026

(54) WATER PURIFIER AND CONTROL METHOD OF SAME

(71) Applicant: SAMSUNG ELECTRONICS CO., LTD., Suwon-si (KR)

(72) Inventors: Jungha Park, Suwon-si (KR); Jongho Lee, Suwon-si (KR); Sungpil Choi, Suwon-si (KR); Junggeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 420 days.

(21) Appl. No.: 18/206,172

(22) Filed: Jun. 6, 2023

(65) Prior Publication Data

US 2023/0322602 A1 Oct. 12, 2023

Related U.S. Application Data

(63) Continuation of application No. PCT/KR2021/017762, filed on Nov. 29, 2021.

(30) Foreign Application Priority Data

Jan. 15, 2021 (KR) .......................... 10-2021-0005694

(51) Int. Cl.
*C02F 9/20* (2023.01)
*C02F 1/42* (2023.01)
(Continued)

(52) U.S. Cl.
CPC .................. *C02F 9/20* (2023.01); *C02F 1/42* (2013.01); *C02F 1/44* (2013.01); *C02F 1/461* (2013.01);
(Continued)

(58) Field of Classification Search
CPC ...... C02F 9/20; C02F 1/42; C02F 1/44; C02F 1/461; C02F 2201/005; C02F 2201/007;
(Continued)

(56) References Cited

U.S. PATENT DOCUMENTS 9,872,584 B2  1/2018  Mazzoni et al.
10,266,441 B2  4/2019  Lee et al.
(Continued)

FOREIGN PATENT DOCUMENTS

CN  106396214 B  *  9/2019  ................ C02F 9/00
JP  8-24841  1/1996
(Continued)

OTHER PUBLICATIONS

English language machine translation of KR20130127680A, 13 pages, No Date.*

(Continued)

*Primary Examiner* — Pranav N Patel
(74) *Attorney, Agent, or Firm* — STAAS & HALSEY LLP

(57) ABSTRACT

A water purifier comprising a pre-treatment filter connectable to an inlet flow path; an auxiliary filter including a filter cap and a filter body, connectable to a first connection flow path; a membrane filter including a filter cap and a filter body, so that water discharged from the auxiliary filter is introduced through a second connection flow path; a post-treatment filter including a filter cap and a filter body, so that water discharged from the membrane filter is introduced through a third connection flow path; a branch flow path that branches off from an upstream side of the first connection flow path and merges on a downstream side of the first connection flow path; an electrolysis module arrangeable along the branch flow path; and an opening/closing valve arrangeable along the first connection flow path so that water (Continued)

flows to the first connection flow path or the branch flow path.

15 Claims, 12 Drawing Sheets

(51) Int. Cl.
*C02F 1/44* (2023.01)
*C02F 1/461* (2023.01)

(52) U.S. Cl.
CPC .. *C02F 2201/005* (2013.01); *C02F 2201/007* (2013.01); *C02F 2209/006* (2013.01); *C02F 2209/10* (2013.01); *C02F 2301/043* (2013.01); *C02F 2303/16* (2013.01)

(58) Field of Classification Search
CPC ............ C02F 2209/006; C02F 2209/10; C02F 2301/043; C02F 2303/16; C02F 1/001; C02F 1/467; C02F 2209/005; B67D 1/00; B67D 1/07; B67D 1/08; B67D 1/12; B67D 1/0857; B67D 1/0895; B67D 2001/0093; B67D 2001/0097; B67D 2001/075; B67D 2210/0001
See application file for complete search history.

(56) References Cited

U.S. PATENT DOCUMENTS

| | | | |
|---|---|---|---|
| 2013/0062219 A1* | 3/2013 | Lee | B01D 61/12 205/742 |
| 2020/0361793 A1 | 11/2020 | You et al. | |

FOREIGN PATENT DOCUMENTS

| | | |
|---|---|---|
| JP | 2009-234591 | 10/2009 |
| JP | 6538700 | 7/2019 |
| KR | 10-0507265 | 8/2005 |
| KR | 10-2009-0082592 | 7/2009 |
| KR | 10-2011-0127588 | 11/2011 |
| KR | 10-2013-0104089 | 9/2013 |
| KR | 10-1444786 | 9/2014 |
| KR | 10-1542122 | 8/2015 |
| KR | 10-1564265 | 10/2015 |
| KR | 10-1575049 | 12/2015 |
| KR | 10-2016-0063306 | 6/2016 |
| KR | 10-2016-0104759 | 9/2016 |
| KR | 10-2016-0105262 | 9/2016 |
| KR | 10-1674216 | 11/2016 |
| KR | 10-1870879 | 6/2018 |
| KR | 10-2058059 | 12/2019 |
| KR | 10-2121801 | 6/2020 |
| KR | 10-2020-0132601 | 11/2020 |

OTHER PUBLICATIONS

English language machine translation of CN106396214B, 8 pages, No Date.*

International Search Report dated Mar. 16, 2022 in International Patent Application No. PCT/KR2021/017762.

* cited by examiner

WATER PURIFIER AND CONTROL METHOD OF SAME

CROSS-REFERENCE TO RELATED APPLICATION

This application is a continuation application, under 35 U.S.C. § 111 (a), of international application No. PCT/KR2021/017762, filed on Nov. 29, 2021, which claims priority under 35 U. S. C. § 119 to Korean Patent Application No. 10-2021-0005694, filed Jan. 15, 2021, the disclosures of which are incorporated herein by reference in their entirety.

BACKGROUND

Field

The disclosure relates to a water purifier performing a regeneration function of an auxiliary filter comprising an ion exchange resin, and a control method thereof.

Discussion of Related Art

In general, a reverse osmosis (RO) filter, one of the membrane filters applied in the water treatment system of a water purifier, is provided to remove various ionic substances, heavy metals, bacteria, viruses, etc. contained in raw water, and is known as the most advanced membrane filter among water treatment filters.

The separation membrane of a membrane filter is a semi-permeable membrane with very fine pores of 0.0001 um or less, and is used with a pump over a certain water pressure.

Factors that determine the life of a filter system including such a membrane filter are the treatment capacity of the membrane filter, such as the membrane area and size of the separator, the application of an auxiliary filter that can partially replace the function of the membrane filter, and the application of auxiliary means to regenerate or clean the contaminated filter.

In order to improve the lifetime of the filter, in the case of a reverse osmosis filter, a large capacity is applied, from 2 to up to 8 times larger than the other filters in the system, and at the same time, a large pump is applied to apply the appropriate pressure to the filter, which can lead to oversizing of the entire filter system and pump noise.

In addition, among the auxiliary filters, water treatment filters containing ion exchange resin are limited in processing capacity by themselves, and in the case of electrochemical filters, another auxiliary filter, the configuration of circuits and switches that can control them is essential.

In addition, in the case of a cleaning module that performs cleaning of a membrane filter or an auxiliary filter, an electrolytic substance such as a separate salt is input to generate acidic or alkaline water and utilize it as cleaning water. In this case, an electrolyzer to generate the cleaning water and a separate flow path to discharge it after cleaning must be organized.

SUMMARY

According to an embodiment of the disclosure, there is provided a water purifier comprising: a pre-treatment filter that is connectable to an inlet flow path to allow water to be introduced from an outside of the water purifier and pre-treat the water while the pre-treatment filter is connected to the inlet flow path; an auxiliary filter including a filter cap and a filter body, which includes an ion exchange resin that removes ions contained in the water introduced through the inlet flow path, is the auxiliary filter being connectable to a first connection flow path so that water discharged from the pre-treatment filter is introduced through the first connection flow path while the auxiliary filter is connected to the first connection flow path; a membrane filter including a filter cap and a filter body to filter out foreign substances contained in the water that has passed through the auxiliary filter, the membrane filter being connectable to a second connection flow path so that water discharged from the auxiliary filter is introduced through the second connection flow path while the membrane filter is connected to the second connection flow path; a post-treatment filter including a filter cap and a filter body to perform a post-treatment on the water that has passed through the membrane filter, the post-treatment filter being connectable to a third connection flow path so that water discharged from the membrane filter is introduced through the third connection flow path while the post-treatment filter is connected to the third connection flow path; a branch flow path that branches off from an upstream side of the first connection flow path and merges on a downstream side of the first connection flow path; an electrolysis module arrangeable along the branch flow path so that while the electrolysis module is arranged along the branch flow path the electrolysis module electrolyzes the water; and an opening/closing valve arrangeable along the first connection flow path between the pre-treatment filter and the auxiliary filter so that while the opening/closing valve is arranged along the first connection flow path, water is caused to flow to the first connection flow path or the branch flow path.

While the opening/closing valve closes the branch flow path, the water sequentially passes through the filter body of the auxiliary filter, the filter body of the membrane filter, and the filter body of the post-treatment filter and is output as purified water, and while the opening/closing valve opens the branch flow path, the water is discharged through the electrolysis module passing through at least the filter cap of the auxiliary filter or the filter cap of the membrane filter without passing through at least the filter body of the auxiliary filter or the filter body of the membrane filter.

The filter cap of the auxiliary filter may be arranged to prevent the water from bypassing, and the filter cap of the membrane filter is arranged to prevent the water from bypassing, and the water introduced into the auxiliary filter may bypass through the filter cap of the membrane filter after regenerating the filter body of the auxiliary filter.

The filter cap of the auxiliary filter may include an inlet pipe connectable to the first connection flow path and an outlet pipe connectable to the second connection flow path, and the filter cap of the membrane filter may include an inlet pipe connectable to the second connection flow path, an outlet pipe connectable to the third connection flow path, a bridge pipe connectable the inlet pipe and the outlet pipe so that the water bypass, and a drain pipe from which the water is discharged.

The water purifier may further comprise a wastewater flow path connectable to the filter cap of the membrane filter to discharge the water to the outside of the water purifier.

The filter cap of the auxiliary filter may be arranged to allow the water to bypass, and the filter cap of the membrane filter is arranged to prevent the water from bypassing, and the water introduced into the auxiliary filter may bypass through the filter cap and then sterilizes the wastewater flow path connectable to the filter cap of the membrane filter.

The filter cap of the auxiliary filter may include an inlet pipe connectable to the first connection flow path and an outlet pipe connectable to the second connection flow path and a bypass pipe communicating with the inlet pipe and connectable to the second connection flow path for the water to bypass and move to the membrane filter, and the filter cap of the membrane filter may include an inlet pipe connectable to the second connection flow path, an outlet pipe connectable to the third connection flow path, a bridge pipe connectable the inlet pipe and the outlet pipe so that the water is bypassed, and a drain pipe from which the water is discharged.

The water purifier may further comprise an outlet flow path connectable to the post-treatment filter; a second opening/closing valve arranged on the outlet flow path to open and close the outlet flow path; and a third opening/closing valve arranged on the wastewater flow path to open and close the wastewater flow path.

The second opening/closing valve may open the outlet flow path when the first opening/closing valve closes the branch flow path, and the second opening/closing valve may close the outlet flow path so that the water is discharged through the wastewater flow path when the first opening/closing valve opens the branch flow path.

The filter caps of the auxiliary filter, the membrane filter and the post-treatment filter may be arranged to allow the water to bypass.

The water purifier may further comprise an outlet flow path connectable to the post-treatment filter; and a second opening/closing valve arranged to open and close the outlet flow path on the outlet flow path.

The second opening/closing valve may open the outlet flow path when the first opening/closing valve opens the branch flow path.

The water purifier may further comprise a storage tank that is connectable to the outlet flow path and is arranged to hold water flowing along the outlet flow path, and the water sequentially bypassing the filter caps of the auxiliary filter, the membrane filter and the post-treatment filter may sterilize the storage tank.

The water purifier may further comprise a pump, one side is connectable to the storage tank via a first connection pipe and an other side connectable to a first outlet pipe to discharge water, and provided to pump the water to increase a water pressure; a heater module having one side connectable to the pump via a second connection pipe and an other side connectable to a second outlet pipe to discharge water, and provided to heat the water to produce hot water; and a cooling water generation module having one side connectable to the pump through a third connection pipe and an other side connectable to a third outlet pipe to discharge water, and provided to cool the water to produce cold water.

The water that has sterilized the storage tank may be discharged from the storage tank to sterilize the first to third connection pipes and the first to third output pipes.

The water purifier may further comprise a TDS sensor arranged on the inlet flow path to measure an amount of TDS (Total Dissolved Solids) contained in the water entering the inlet flow path; and a main processor that causes the first opening/closing valve to open the branch flow path based on a value measured by the TDS sensor.

The main processor may set a regeneration cycle value of said auxiliary filter according to a value measured by the TDS sensor, count and accumulate the elapsed time of regeneration of the auxiliary filter when the first opening/closing valve is opened to yield the accumulated elapsed time count value, compare the elapsed time count value with the regeneration cycle value, generate a regeneration reminder signal when the elapsed time count value exceeds the regeneration cycle value, and control the first opening/closing valve to open the branch flow, so that regeneration of the auxiliary filter proceeds automatically.

According to an embodiment of the disclosure, there is provided a water purifier comprising: an auxiliary filter comprising a filter cap and a filter body comprising an ion exchange resin to remove ions contained in the water, the auxiliary filter being connectable to the first connection flow path to receive water; a membrane filter comprising a filter cap and a filter body for filtering foreign matter contained in the water passed through the auxiliary filter, the membrane filter being connectable to the second connection flow path for receiving water exiting the auxiliary filter, a branch flow path branching from an upstream side of the first connection flow path and converging at a downstream side of the first connection flow path, an electrolysis module arrangeable on the branch flow path to electrolyze water to produce clean water, and an opening/closing valve arrangeable on the first connection flow path to open and close the branch flow path.

The water purifier can perform the purified water supply mode by closing the branch flow path so that the water passes through the filter body of the auxiliary filter and the body of the membrane filter and is output as purified water, or the water purifier may perform the regeneration mode by opening the branch flow path so that the water passes through the auxiliary filter, regenerates the filter body of the auxiliary filter, and is bypassed from the filter cap of the membrane filter, performing a sanitizing mode, the branch flow path is opened to allow the water to pass through the membrane filter to sanitize the wastewater flow path connectable to the membrane filter after being bypassed from the filter cap of the auxiliary filter.

A method of controlling a water purifier according to another aspect of the present invention, wherein a TDS sensor measures the amount of total dissolved solids (TDS) contained in water entering the inlet flow path, based on the value measured by the TDS sensor, the main processor controlling the opening/closing valve to open or close the branch flow path, the opening/closing valve causing the water to pass through the electrolysis module to produce water, and the water passing through the auxiliary filter to regenerate the filter media of the auxiliary filter.

The method of controlling the main processor controls the opening/closing valve may include setting a regeneration cycle value of the auxiliary filter according to a value measured by the TDS sensor; counting a regeneration elapsed time of the auxiliary filter when the opening/closing valve is opened, and accumulating the accumulated elapsed time count value, comparing the elapsed time count value with the playback cycle value, generating a playback notification signal when the elapsed time count value exceeds the playback cycle value, and controlling the opening/closing valve to open the branch flow path.

The method of controlling the main processor controls the opening/closing valve may further include an operation in which the water passes through the auxiliary filter, the membrane filter, and the post-treatment filter in turn and is output as purified water, when the branch flow path is closed.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
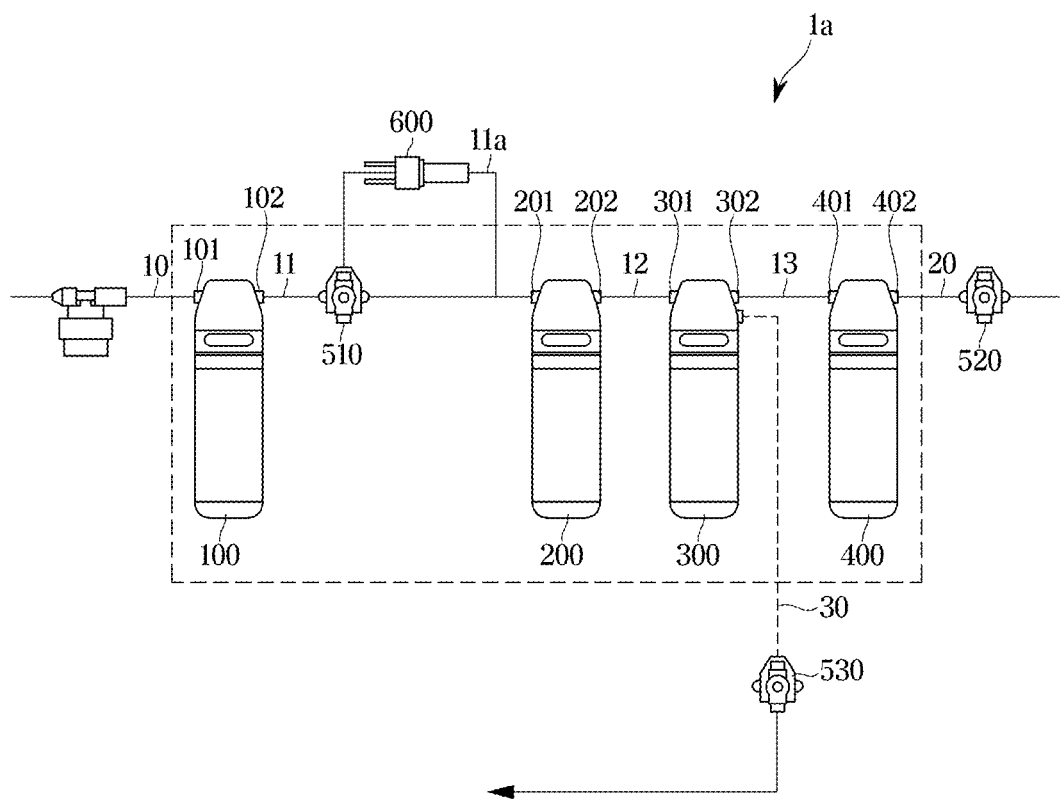
FIG. 1 is a diagram illustrating a water supply mode of a water purifier according to one embodiment of the present invention.

The embodiments described herein and the configurations illustrated in the drawings are merely preferred examples of the disclosed invention, and there are many variations that may be made in place of the embodiments and drawings described herein at the time of filing of this application.

In addition, identical reference numerals or symbols in each drawing of this specification designate parts or components that perform substantially the same function.

Further, the terminology used herein is for the purpose of describing embodiments and is not intended to limit and/or define the disclosed invention. Expressions in the singular include the plural unless the context clearly indicates otherwise. As used herein, the terms "includes" or "has" are intended to designate the presence of the features, numbers, steps, actions, components, parts, or combinations thereof recited, and do not preclude the presence or addition of one or more other features, numbers, steps, actions, components, parts, or combinations thereof.

Further, as used herein, ordinal terms such as "first," "second," and the like may be used to describe various components, but the components are not limited by the terms, and the terms are used only to distinguish one component from another. For example, without departing from the scope of the present invention, a first component may be named as a second component, and similarly, a second component may be named as a first component. The term "and/or" includes a combination of a plurality of related recited items or any of a plurality of related recited items.

One aspect of the disclosure provides a water purifier and a control method thereof capable of securing life and miniaturization of a membrane filter through continuous cleaning of an auxiliary filter.

A water purifier according to the above-mentioned ideas of the present invention does not require a conventionally used electrolyzer and salt injection device for generating wash water, and can realize a miniaturization of a filter regeneration system structure by generating wash water through an electrolysis module arranged in a branch flow path branching from an inlet flow path.

Furthermore, the filter can be selectively regenerated by making a particular filter include a bypassable filter cap.

Furthermore, depending on the amount of TDS contained in the water, the cleaning of the auxiliary filter can be automatically performed when the amount of TDS is above a threshold.

Embodiments will be described in more detail below with reference to the accompanying drawings.

FIG. 1 is a diagram illustrating a water supply mode of a water purifier according to one embodiment of the present invention.

Referring to FIG. 1, a water purifier 1 includes an inlet flow path 10, a pretreatment filter 100, an auxiliary filter 200, a membrane filter 300, a post-treatment filter 400, an outlet flow path 20, and a wastewater flow path 30.

The inlet flow path 10 may be arranged to introduce water from the outside. The inlet flow path 10 may be arranged to allow water to flow in one direction. The inlet flow path 10 may be connected to the pre-treatment filter 100. The inlet flow path 10 may be connected to an inlet pipe 101 of the pre-treatment filter 100.

The pre-treatment filter 100 may perform a pre-treatment operation to filter out debris from the water entering the interior. The pre-treatment filter 100 may discharge the pre-treated water through the outlet pipe 102. The pre-treatment filter 100 may include a pre-carbon filter, a sedimentation filter, a high turbidity filter, or a composite filter that combines a sedimentation filter and a pre-carbon filter. By utilizing a composite filter, the pre-treatment filter 100 can remove large debris while also removing chlorine, organic compounds, odors, and colors through adsorption. Additionally, the pre-treatment filter 100 may include a granular activated carbon filter (GAC filter), a block carbon filter, or a filter processed by high heat treatment of coconut.

The auxiliary filter 200 may be connected to the pre-treatment filter 100 via the first connection flow path 11. One side of the first connection flow path 11 may be coupled to the outlet pipe 102 of the pre-treatment filter 100 and the other side may be coupled to the inlet pipe 201 of the auxiliary filter 200.

The auxiliary filter 200 is a filter including a filter body comprising an ion exchange resin, which can filter ions contained in water.

Water that has passed through the filter body of the auxiliary filter 200 may travel along the second connection flow path 12 and enter the interior of the membrane filter 300.

The membrane filter 300 may be connected to the auxiliary filter 200 via the second connection flow path 12. One side of the second connection flow path 12 may be coupled to an outlet pipe of the auxiliary filter 200 and the other side may be coupled to an inlet pipe of the membrane filter 300.

The membrane filter 300 may comprise a filter body including one of an ultrafiltration membrane, a nanofiltration membrane, and a salt osmosis membrane. Although the pre-treatment filter 100 and the membrane filter 300 are configured separately, the pre-treatment filter 100 and the membrane filter 300 may be configured as a single composite filter coupled to each other.

The membrane filter 300 may be connected to the wastewater flow path 30. A portion of the water that has passed through the filter body of the membrane filter 300 may be discharged to the outside via the wastewater flow path 30. In addition, ions desorbed from the auxiliary filter 200 may also be transferred to the membrane filter 300 and discharged to the outside via the wastewater flow path 30.

The wastewater flow path 30 may be connected to the drain pipe 303 of the membrane filter 300, and may discharge water containing debris (wastewater) to the outside.

The post-treatment filter 400 may be connected to the membrane filter 300 via the third connection flow path 13. The post-treatment filter 400 may include a filter body that performs post-treatment operations on the water that has passed through the membrane filter 300.

The post-treatment filter 400 may be connected with the outlet flow path 20.

The post-treatment filter 400 can improve the taste of the water by adsorbing particulate matter and removing gases and odors. The post-treatment filter 400 may include at least one of a Granular Activated Carbon filter (GAC filter), a Block carbon filter, a Silver carbon filter, a DeIonization Resin filter (DI Resin filter), and a Taste Chlorine Reduction filter (TCR filter).

The post-treated water travels along the outlet flow path 20 and is stored in a storage tank as purified water, which can be supplied to the user.

The water purifier 1a may further include a first opening/closing valve 510 provided on the first connection flow path 11 to control the flow of water flowing along the first connection flow path 11, a second opening/closing valve 520 provided on the outlet flow path 20 to control the flow of water flowing along the outlet flow path 20, and a third opening/closing valve 530 provided on the wastewater flow path 30 to control the flow of water flowing along the wastewater flow path 30.

Figure 2:
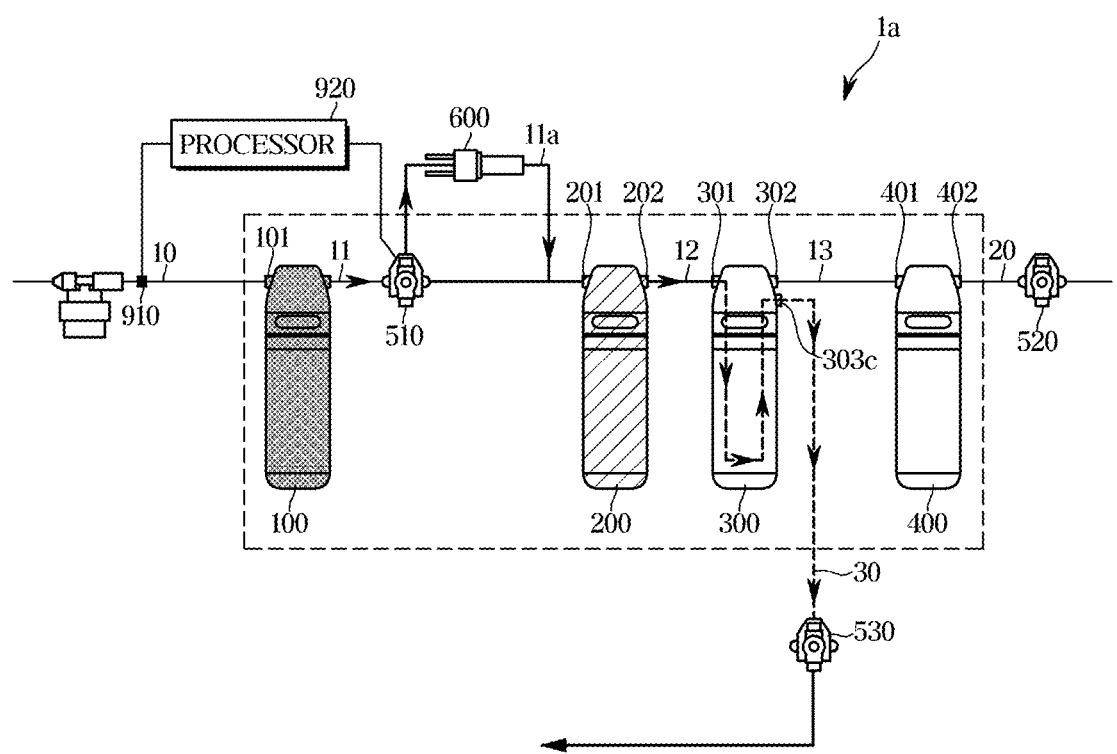
FIG. 2 is a diagram illustrating a regeneration mode of the water purifier of FIG. 1 according to an embodiment of the present invention.
Figure 3:
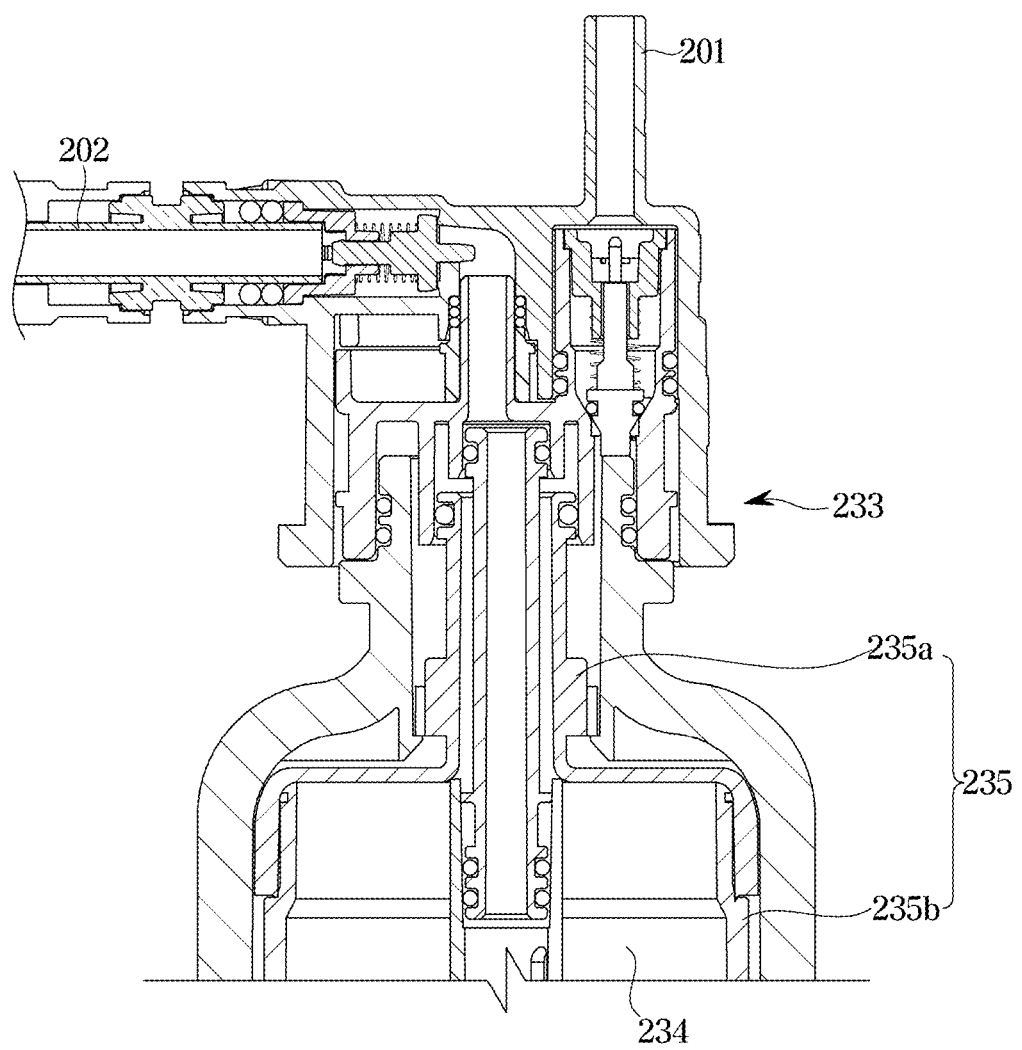
FIG. 3 is a cross-sectional view of an auxiliary filter of the water purifier of FIG. 2 according to an embodiment of the present invention.
Figure 4:
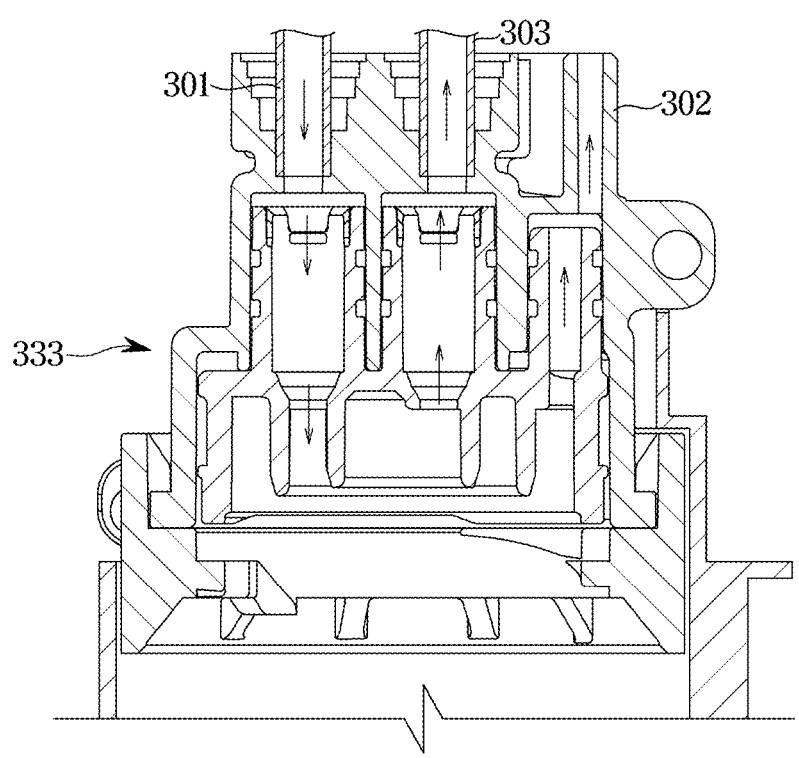
FIG. 4 is a cross-sectional view of a membrane filter of the water purifier of FIG. 2 according to an embodiment of the present invention.
Figure 5:
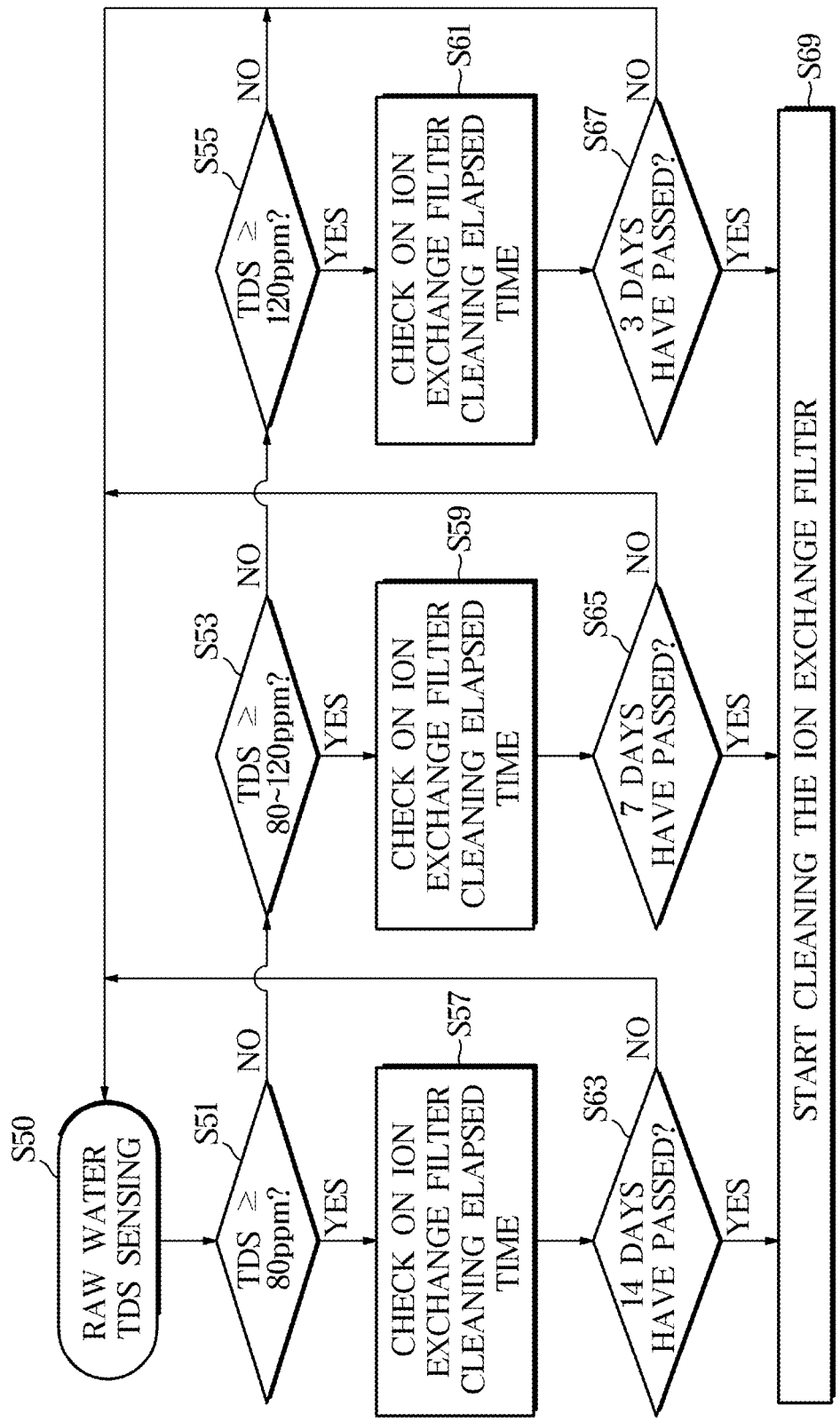
FIG. 5 is a flow diagram illustrating the operation of the processor of the water purifier of FIG. 2 according to an embodiment of the present invention.

FIG. 2 is a diagram illustrating a regeneration mode of the water purifier of FIG. 1. FIG. 3 is a cross-sectional view of an auxiliary filter of the water purifier of FIG. 2. FIG. 4 is a cross-sectional view of a membrane filter of the water purifier of FIG. 2. FIG. 5 is a flow diagram illustrating the operation of the processor of the water purifier of FIG. 2.

Referring to FIG. 2, the water purifier 1a may further include a branch flow path 11a that branches off one side of the first connection flow path 11 and joins the other side of the first connection flow path 11, and an electrolysis module 600 disposed on the branch flow path 11a to perform an electrolysis operation of the water.

In this case, water flows from a first side of the first connection flow path 11 toward a second side of the first connection flow path 11, so that the second side of the first connection flow path 11 may be arranged on a downstream side of the first side of the first connection flow path 11. The branch flow path 11a may branch from the upstream side of the first connection flow path 11 and join at the downstream side of the first connection flow path 11.

The electrolysis module 600 can electrolyze water to produce wash water arranged to clean the filter, i.e., water can be made into wash water by the electrolysis module 600 arranged in the branch flow path 11a. The electrolysis module 600 may include, but is not limited to, a UV lamp or LED module.

The first opening/closing valve 510 described above may be provided at a contact point where the first connection flow path 11 and the branch flow path 11a diverge. The first opening/closing valve 510 may open the first connection flow path 11 or the branch flow path 11a to allow water to flow through the first connection flow path 11 or the branch flow path 11a.

Since water must be moved to the branch flow path 11a to generate wash water, in regeneration mode, the first opening/closing valve 510 can open the branch flow path 11a and close the first connection flow path 11.

The wash water generated by the electrolysis module 600 may travel to the other side of the first connection flow path 11 where the branch flow path 11a joins and enter the interior of the auxiliary filter 200. The wash water that flows into the interior of the auxiliary filter 200 may perform a regeneration operation of the auxiliary filter 200.

The wash water may contain ions exchanged by the electrolysis module 600, and as it passes through the auxiliary filter 200, it may be subjected to ion exchange with these ions to remove contaminant ions adsorbed on the auxiliary filter 200. The auxiliary filter 200 may be returned to its initial state as the adsorbed fouling ions are removed and the exchanged ions are adsorbed from the wash water.

The wash water may be moved to the interior of the auxiliary filter 200 to perform regeneration of the filter body of the auxiliary filter 200 and then pass through the auxiliary filter 200. After passing through the auxiliary filter 200, the wash water may be moved to the filter case of the membrane filter 300 and discharged to the outside via the wastewater flow path 30.

Referring to FIG. 3, the auxiliary filter 200 may include a filter cap 233 and a filter case 235 that is coupled to the filter cap 233 and includes a filter body 234 for exchanging ions contained in the water. The filter case 235 includes a upper portion 235a and a lower portion 235b.

The washing water may enter the inlet pipe 201 of the filter cap 233, pass through the filter body 234, and exit through the outlet pipe 202 of the filter cap 233. The inlet pipe 201 may be arranged to receive water in the longitudinal direction of the filter body 234, and the outlet pipe 202 may be arranged to receive water in a direction perpendicular to the longitudinal direction of the filter body 234.

The outlet pipe 202 of the filter cap 233 of the auxiliary filter 200 may be connected to the inlet pipe 301 of the filter cap 333 of the membrane filter 300.

Referring to FIG. 4, the membrane filter 300 may include a filter cap 333, and a filter case (not shown) that is coupled to the filter cap 333 and includes a filter body (not shown) for filtering contaminants.

Wash water may enter the inlet pipe 301 of the filter cap 333 of the membrane filter 300, pass through a filter body inside the filter case that mates with the filter cap 333, and exit through the outlet pipe 303 of the filter cap 333 of the membrane filter 300.

In this case, the second opening/closing valve 202 closes the outlet flow path 20 that connects with the outlet pipe 402 of the post-treatment filter 400, so that the wash water does not flow to the outlet pipe 302 of the membrane filter 300 that connects with the inlet pipe 401 of the post-treatment filter 400, it can be discharged into the drain pipe 303 of the membrane filter 300, and the wash water discharged into the drain pipe 303 can be discharged to the outside via the wastewater flow path 30.

Referring now to FIGS. 2 and 5, the water purifier 1a may further include a TDS sensor 910 and a main processor 920.

A TDS sensor 910 may be provided on the inlet flow path 10 to measure the amount of total dissolved solids (TDS) contained in the water entering the inlet flow path 10 (operation S50 in FIG. 5).

The main processor 920 may receive the measured value from the TDS sensor 910 (operation S21, see FIG. 7), and may cause the first opening/closing valve 510 to open the branch flow path 11a according to the measured value from the TDS sensor 910. In other words, the main processor 920 may open the branch flow path 11a to regenerate the filter if the amount of TDS in the water is above a threshold value.

The main processor 920 may set a regeneration cycle value for the auxiliary filter 200 based on the value measured by the TDS sensor 910.

For example, if the amount of TDS in the water is 80 ppm or less, the regeneration cycle value may be set to 14 days, which means that regeneration of the auxiliary filter 200 may occur again if 14 days have passed since the last time regeneration of the auxiliary filter 200 was performed. As illustrated in FIG. 5, the processor of the water purifier of FIG. 2 executes operation(s). For example, if the amount of TDS in the water is 80 ppm or less (Yes at operation S51 in FIG. 5), the process proceeds to operation S57, checking on ion exchange filer cleaning elapsed time, operation S63 in FIG. 5 determining whether 14 days have passed and operation S69 start cleaning the ion exchange filter.

In contrast, if the amount of TDS is greater than 80 ppm and less than or equal to 120 ppm, the regeneration cycle value may be set to 8 days, and if the amount of TDS is greater than or equal to 120 ppm, the regeneration cycle value may be set to 3 days. As shown in FIG. 5, for example, if the amount of TDS is greater than 80 ppm and less than or equal to 120 ppm (at operation S53 in FIG. 5), the process proceeds to operation S59, checking on ion exchange filer cleaning elapsed time, operation S65 in FIG. 5 determining whether 7 days have passed and operation S69 start cleaning the ion exchange filter. Further, if the amount of TDS is greater than 120 ppm (at operation S55 in FIG. 5), the process proceeds to operation S61 in FIG. 5, checking on ion exchange filer cleaning elapsed time, operation S67 in FIG. 5 determining whether 3 days have passed and operation S69 start cleaning the ion exchange filter.

The main processor 920 may calculate an elapsed time count value that is accumulated by counting the elapsed time of playback from the time when playback of the auxiliary filter 200 was performed (operation S22, see FIG. 7), that is, the elapsed time from the time when playback of the auxiliary filter 200 was performed immediately before may be calculated as the elapsed time count value. If the playback of the auxiliary filter 200 has not been performed before, the elapsed time count value can be calculated by arbitrarily performing the playback of the auxiliary filter 200 for the first time and counting the time that has elapsed since then.

Next, the elapsed time count value and the playback cycle value are compared (operation S23, see FIG. 7), and a playback notification signal can be generated when the elapsed time count value exceeds the playback cycle value. When the regeneration notification signal is generated, the first opening/closing valve 510 can be controlled to open the branch flow path 11a (operation S24, see FIG. 7) so that regeneration of the auxiliary filter 200 proceeds automatically.

For example, if the amount of TDS measured by the TDS sensor 910 is 80 ppm or less, the main processor 920 may measure an elapsed time count value, open the branch flow path 11a to allow regeneration of the auxiliary filter 200 to proceed if the elapsed time count value is greater than 14 days, and not open the branch flow path 11a if the elapsed time count value is less than 14 days.

In contrast, if the amount of TDS is greater than 80 ppm and greater than 120 ppm, the elapsed time count value may be measured, and if the elapsed time count value is greater than 7 days, the branch flow path 11a may be opened to allow regeneration of the auxiliary filter 200 to proceed, and if the elapsed time count value is less than 7 days, the branch flow path 11a may not be opened.

In contrast, if the amount of TDS contained in the water is 120 ppm or more, the elapsed time count value may be measured, and if the elapsed time count value is greater than 3 days, the branch flow path 11a may be opened to allow regeneration of the auxiliary filter 200 to proceed, and if the elapsed time count value is less than 3 days, the branch flow path 11a may not be opened.

Figure 6:
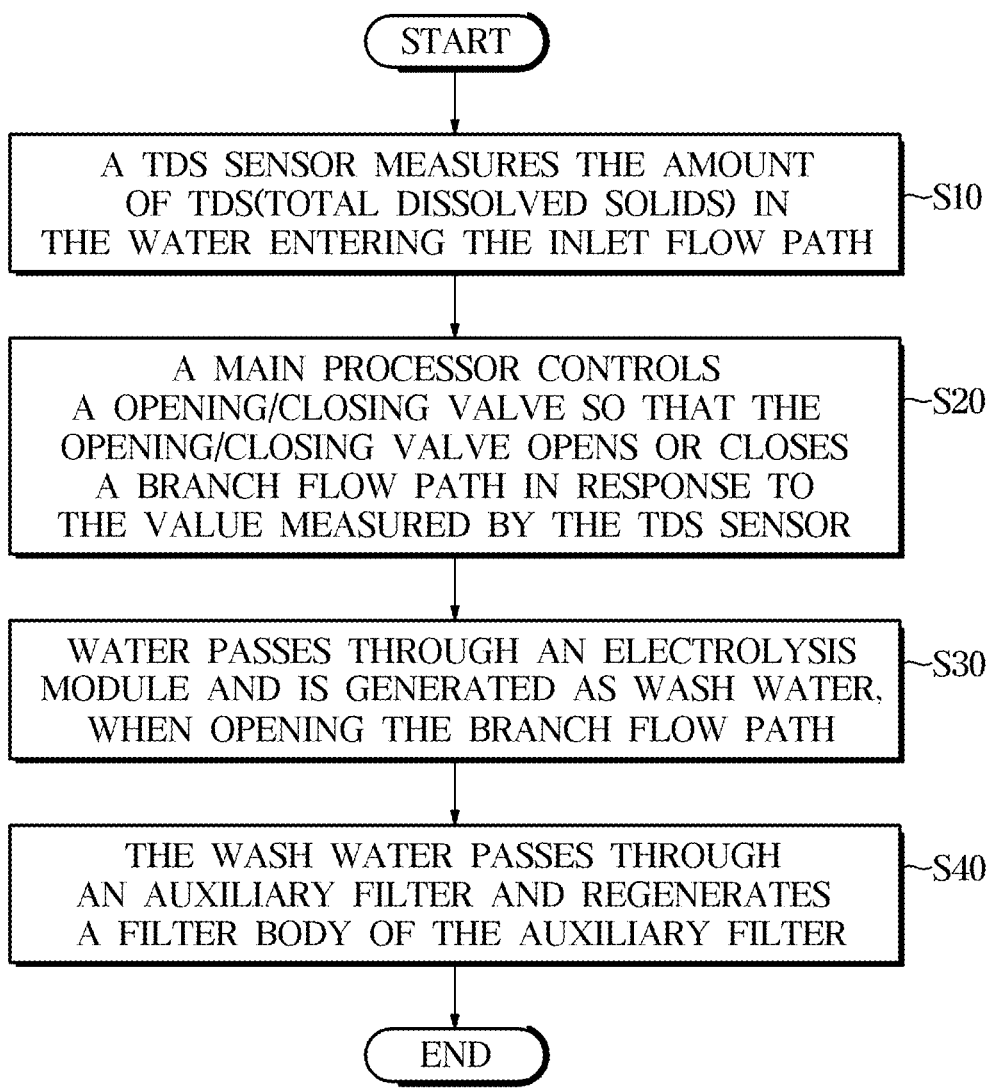
FIG. 6 is a flowchart illustrating a control method of the water purifier of FIG. 2 according to an embodiment of the present invention.
Figure 7:
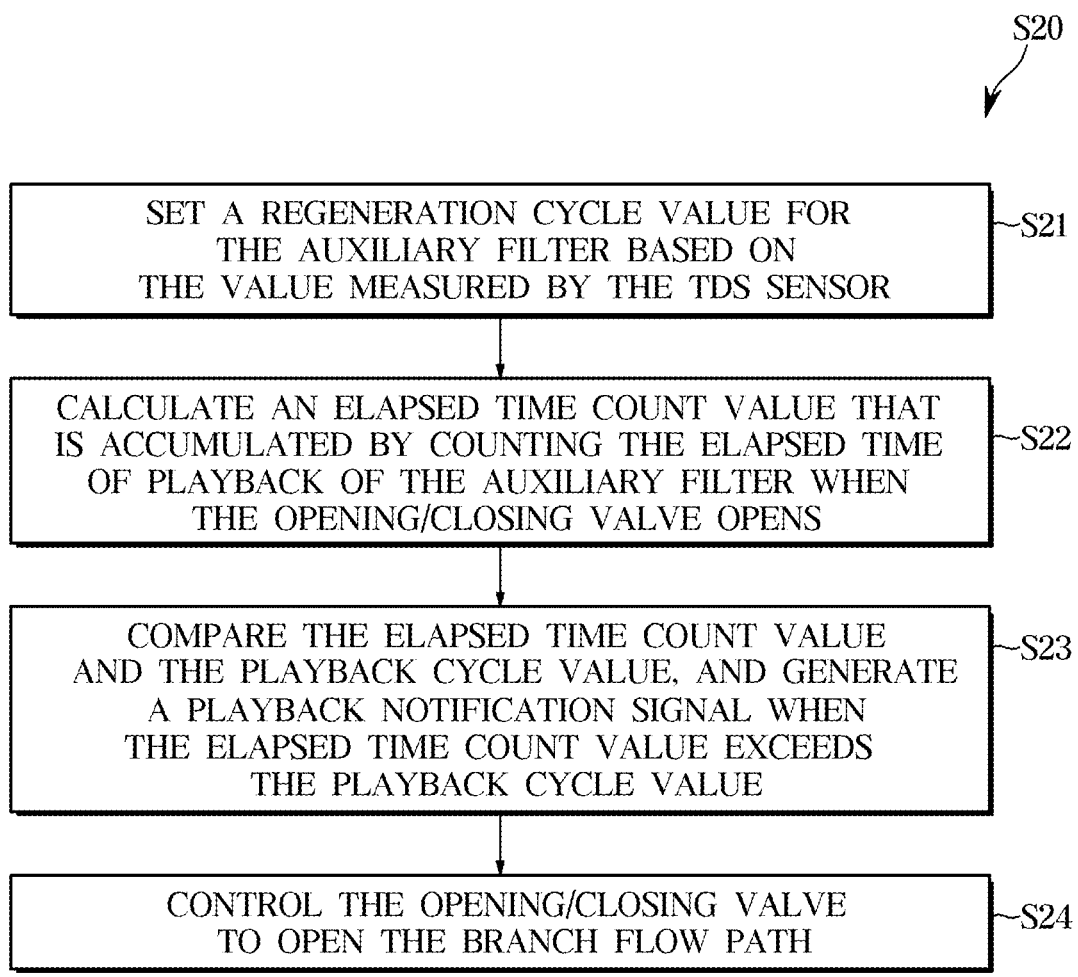
FIG. 7 is a flowchart illustrating the operations of the control method of the water purifier of FIG. 6, wherein the main processor controls an opening/closing valve according to an embodiment of the present invention.

FIG. 6 is a flowchart illustrating the control method of the water purifier of FIG. 2, and FIG. 7 is a flowchart illustrating an operation in which the main processor controls the opening/closing valve in the control method of the water purifier of FIG. 6. Hereinafter, a control method of a water purifier 1 according to the present disclosure will be described in detail with reference to FIGS. 6 and 7.

Referring to FIG. 6, first, a TDS sensor 910 provided on the inlet flow path 10 measures the amount of TDS (Total Dissolved Solids) contained in the water entering the inlet flow path 10 (operation S10).

The main processor 920, which is electrically coupled to the TDS sensor 910, may then receive information from the TDS sensor 910 about the value measured by the TDS sensor 910, i.e., the amount of TDS contained in the water. The main processor 920 is electrically connected to the first opening/closing valve 510 provided on the first connection flow path 11, and controls the first opening/closing valve 510 according to the value measured by the TDS sensor 910 (operation S20).

Specifically, the main processor 920 first sets a regeneration cycle value for the auxiliary filter 200 based on the value measured by the TDS sensor 910 (operation S21).

Then, the main processor 920 counts the playback elapsed time of the auxiliary filter 200 when the first opening/closing valve 510 is opened, and accumulatively calculates an elapsed time count value (operation S22).

Next, the main processor 920 compares the elapsed time count value and the regeneration cycle value, and generates a regeneration notification signal when the elapsed time count value exceeds the regeneration cycle value (operation S23).

Then, the main processor 920 controls the first opening/closing valve 510 so that the first opening/closing valve 510 opens the branch flow path (operation S24).

As described above, causing the first opening/closing valve 510 to open the branch flow path 11a allows water to be moved through the branch flow path 11a to the electrolysis module 600, where the electrolysis module 600 can electrolyze the water to generate washing water (operation S30).

The generated washing water flows into the auxiliary filter 200 and performs a regeneration operation of the auxiliary filter 200 to remove contaminating ions adsorbed on the filter body of the auxiliary filter 200 (operation S40).

On the other hand, although not shown, the main processor 920 compares the elapsed time count value and the regeneration cycle value, and if the elapsed time count value is less than the regeneration cycle value, the main processor 920 may control the first opening/closing valve 510 so that the first opening/closing valve 510 closes the branch flow path. In this case, the water introduced through the inlet flow path 10 may pass through the auxiliary filter 200, the membrane filter 300, and the post-treatment filter 400 in turn and be discharged as purified water.

Figure 8:
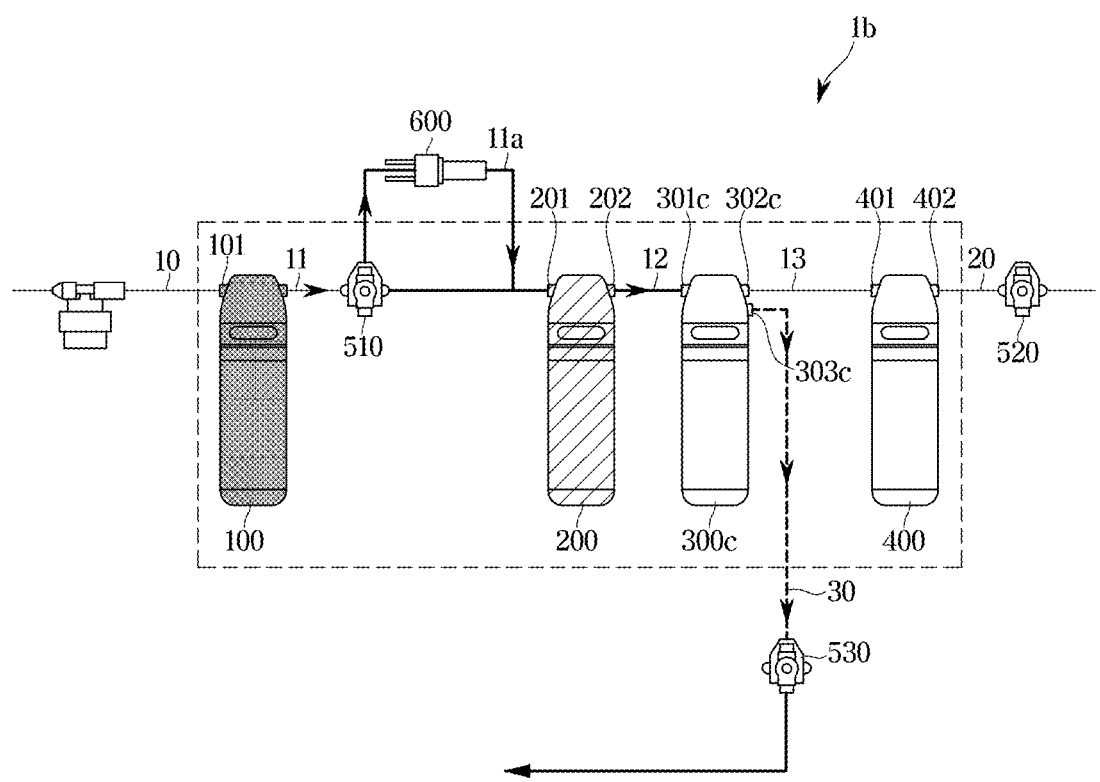
FIG. 8 is a diagram illustrating a regeneration mode of a water purifier according to another embodiment of the present invention according to an embodiment of the present invention.
Figure 9:
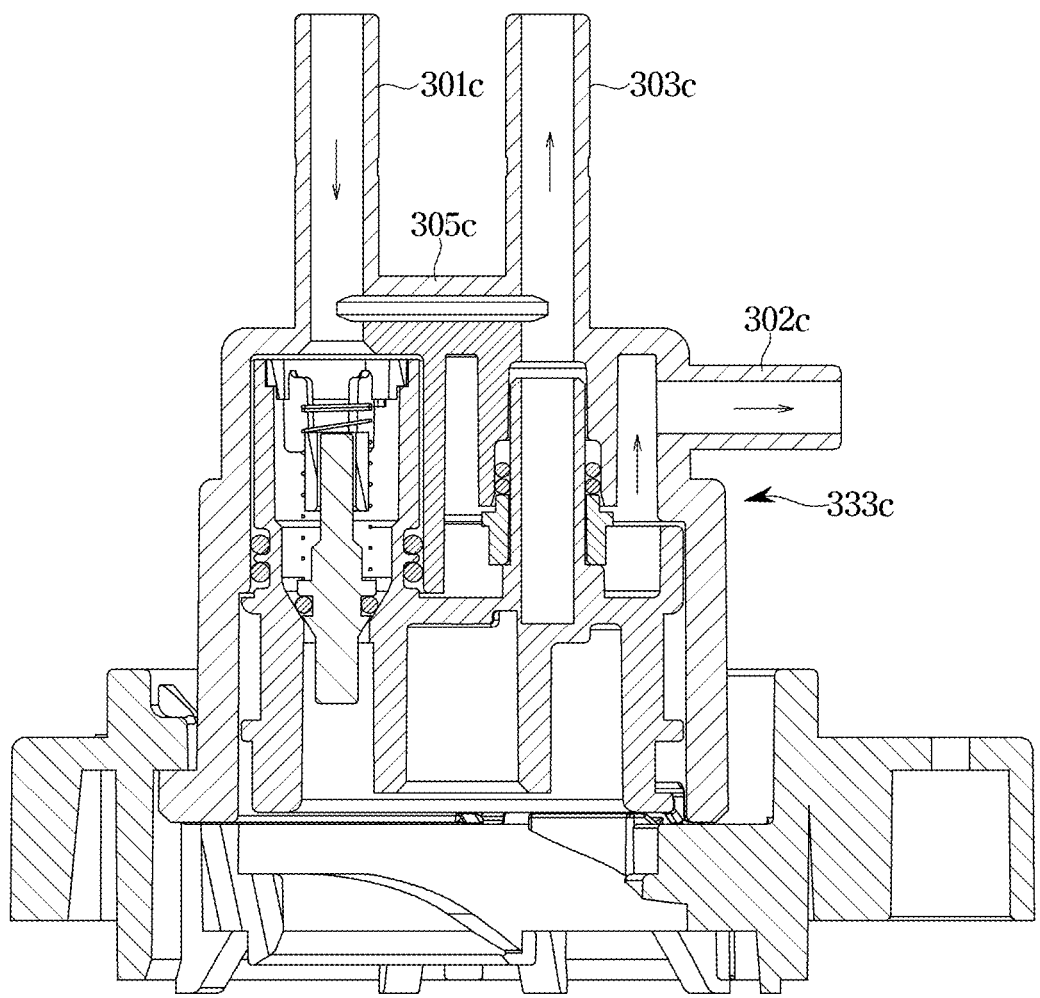
FIG. 9 is a cross-sectional view illustrating a membrane filter of the water purifier of FIG. 8 according to an embodiment of the present invention.

FIG. 8 is a diagram illustrating a regeneration mode of a water purifier according to another embodiment of the present invention. FIG. 9 is a cross-sectional view illustrating a membrane filter of the water purifier of FIG. 8.

The water purifier 1B according to the present disclosure is substantially the same as the water purifier 1A described with reference to FIGS. 1 to 5, except that the wash water is bypassed from the FILTER CAP of the MEMBRANE FILTER, and therefore the same reference numerals will be used and overlapping descriptions will be omitted.

Referring to FIG. 8, in the water purifier 1B, the wash water may travel along the second connection flow path 12 after filtering out contaminants contained within the interior of the auxiliary filter 200 and be bypassed at the filter cap 333 of the membrane filter 300. That is, the wash water may not be moved to the interior of the membrane filter 300c, but may be bypassed at the filter cap 333c of the membrane filter 300c and discharged to the outside along the wastewater flow path 30 coupled to the drain pipe of the membrane filter 300c.

In this case, referring to FIG. 9, the FILTER CAP 333C of the MEMBRANE FILTER 300C may include an inlet pipe 301C, an outlet pipe 302C, a drain pipe 303C, and a bridge pipe 305C connecting the inlet pipe 301C and the drain pipe 302C between the inlet pipe 301C and the drain pipe 303C.

Wash water may be introduced into the inlet pipe 301c at the filter cap 333c, which is prevented from flowing through the outlet pipe 302c when the second opening/closing valve 520 closes the outlet flow path 20. Accordingly, the washing water received in the inlet pipe 301 can be discharged through the bridge pipe 305c to the drain pipe 303c and discharged to the outside along the wastewater flow path 30 combined with the drain pipe 303c.

In this way, the wash water can be bypassed from the filter cap 333 of the membrane filter 300c through the inlet pipe 301c, the bridge pipe 305c, and the drain pipe 303c, and can be discharged to the outside via the wastewater flow path 30 more efficiently because it is not moved to the interior of the filter case of the membrane filter 300c.

Figure 10:
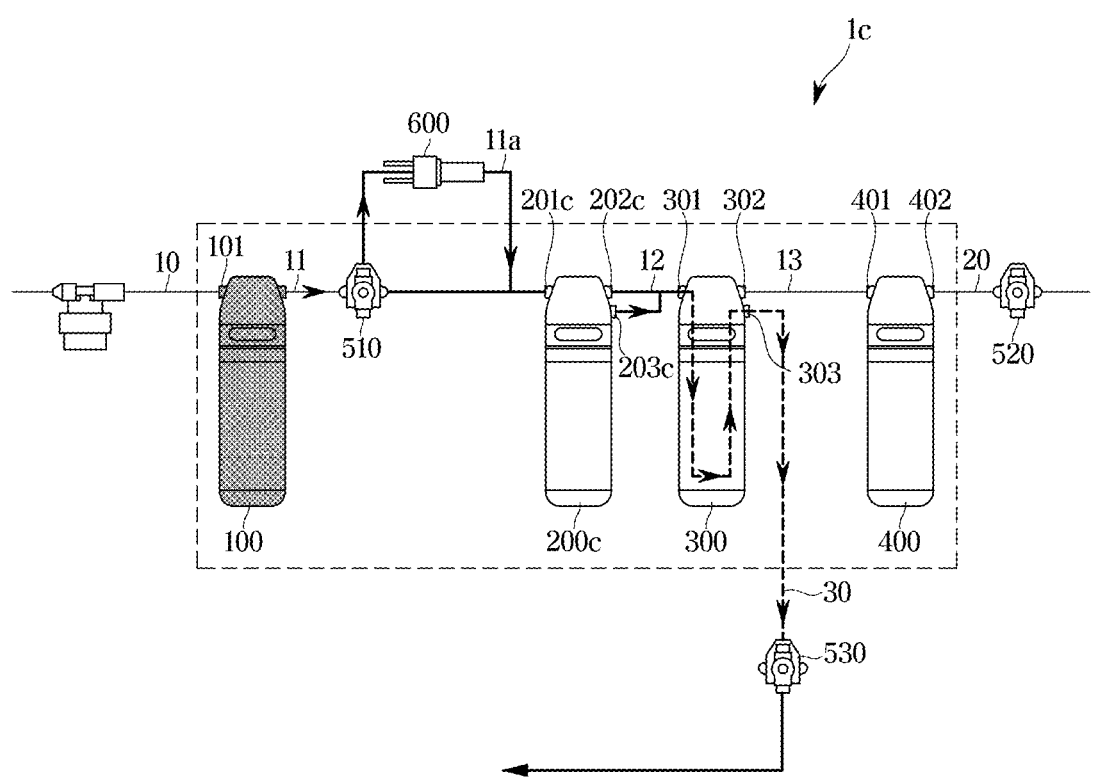
FIG. 10 is a diagram illustrating a sanitizing mode of the water purifier according to another embodiment of the present invention.
Figure 11:
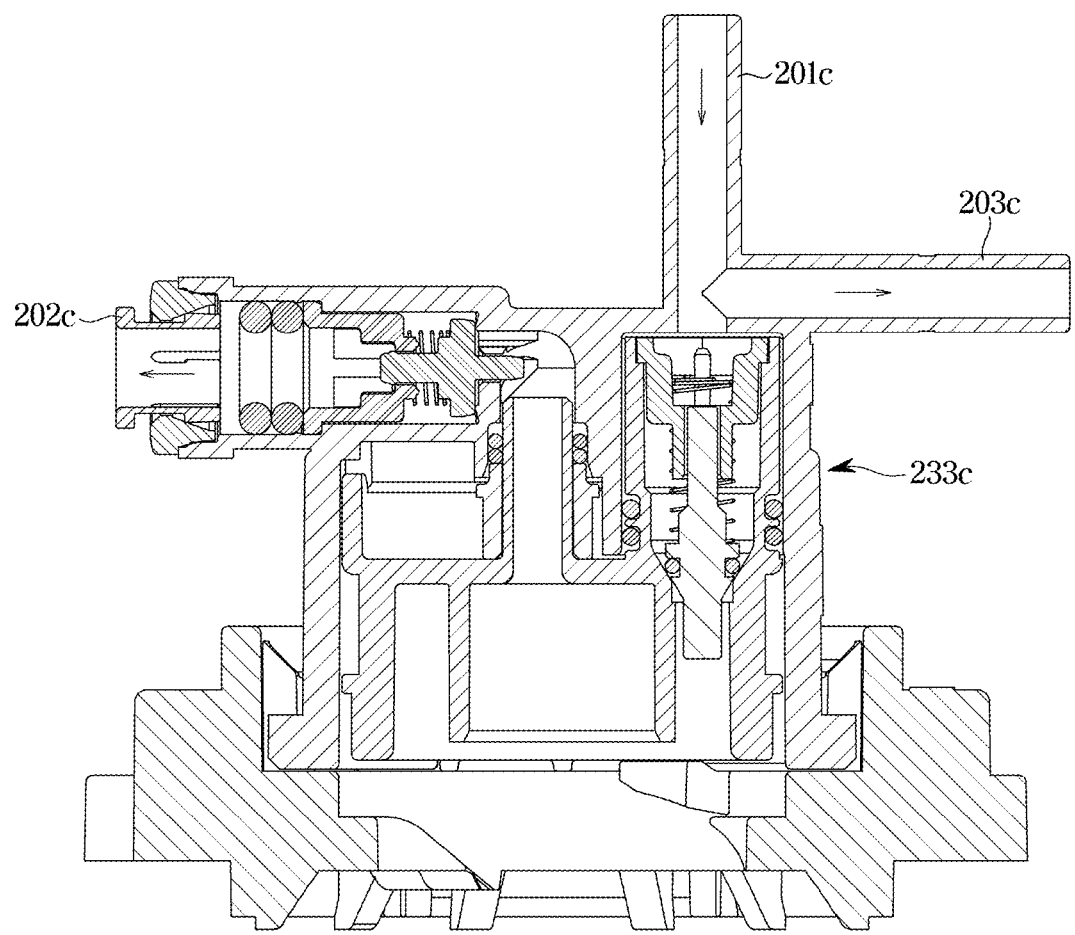
FIG. 11 is a cross-sectional view of an auxiliary filter of the water purifier of FIG. 10 according to an embodiment of the present invention.

FIG. 10 is a diagram illustrating a sanitizing mode of the water purifier according to another embodiment of the present invention. FIG. 11 is a cross-sectional view of an auxiliary filter of the water purifier of FIG. 10.

The water purifier 1C according to the present disclosure is substantially the same as the water purifier 1A described with reference to FIGS. 1 to 5, except that the wash water is bypassed from the FILTER CAP of the AUXILIARY FILTER, so the same reference numerals will be used and redundant descriptions will be omitted.

Referring to FIG. 10, the wash water may be bypassed from the auxiliary filter 200, passed through the membrane filter 300, and discharged through the wastewater flow path 30, so that sterilization of the wastewater flow path 30 can be performed.

In this case, as shown in FIG. 11, the cleaning water may be received into the inlet pipe 201c of the filter cap 233c of the auxiliary filter 200c and drained into the bypass pipe 203c of the filter cap 233c of the auxiliary filter 200c.

In this case, the inlet pipe 201c and the bypass pipe 203c may be arranged perpendicular to each other and may be arranged to be in communication with each other. The wash water received in the inlet pipe 201c may be moved through the bypass pipe 203c without being moved into the interior of the filter case of the auxiliary filter 200, so that it can be bypassed from the filter cap 233c of the auxiliary filter 200c.

In this case, although not shown, a control valve may be provided between the outlet pipe 202c and the bypass pipe 203c of the filter cap 233c of the auxiliary filter 200c, and the control valve may close the outlet pipe 202c so that the wash water is moved to the interior of the filter case of the auxiliary filter 200 and is not moved to the outlet pipe 202c, but is moved only through the bypass pipe 203c.

Since the bypass pipe 203c of the filter cap 233c of the auxiliary filter 200c is connected to the second connection flow path 12, the wash water moved to the bypass pipe 203c of the filter cap 233c of the auxiliary filter 200c can be moved to the membrane filter 300 via the second connection flow path 12.

The wash water may be moved to the membrane filter 300 and discharged to the outside along the wastewater flow path 30 through the bypass pipe 303 of the filter cap 333 of the membrane filter 300.

In this case, as the second valve 520 closes the outlet flow path 20 connecting with the outlet pipe 402 of the post-treatment filter 400, the washing water cannot flow to the outlet pipe 302 of the membrane filter 300 connecting with the inlet pipe 401 of the post-treatment filter 400, so that all of the washing water discharged to the bypass pipe 303 of the membrane filter 300 can be discharged to the outside through the wastewater flow path 30.

Figure 12:
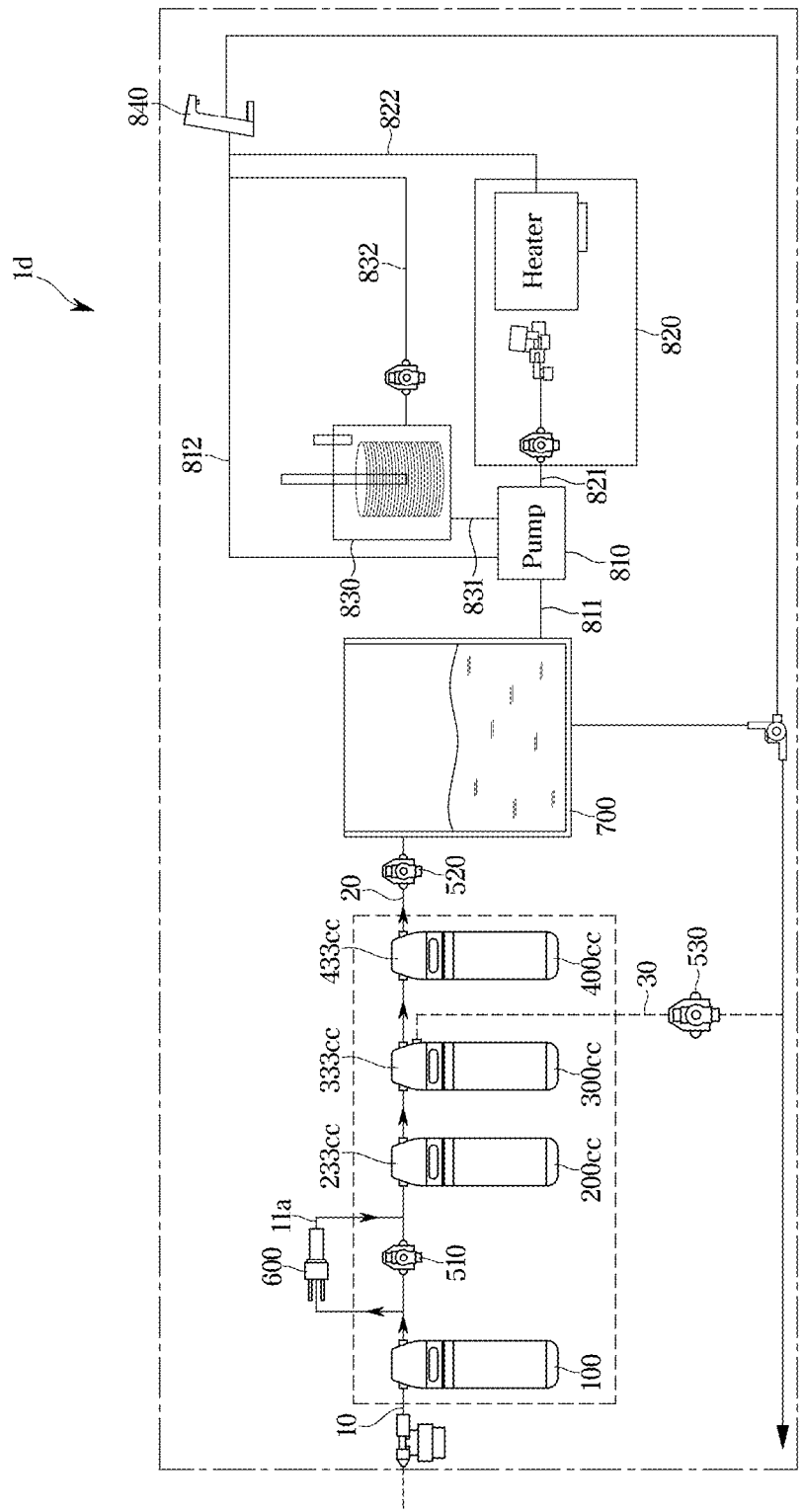
FIG. 12 is a cross-sectional view of a sanitizing mode of a water purifier according to another embodiment of the present invention.

FIG. 12 is a cross-sectional view of a sanitizing mode of a water purifier according to another embodiment of the present invention.

The water purifier 1D according to the present disclosure is substantially the same as the water purifier 1A described with reference to FIGS. 1 to 5, except that the wash water is bypassed from the filter cap of the membrane filter and then bypassed from the filter cap of the auxiliary filter, so the same reference numerals will be used and overlapping descriptions will be omitted.

Referring to FIG. 12, the water purifier 1D may perform a sanitizing mode in which a storage tank 700 and a plurality of pipes connecting to the storage tank 700 are sanitized.

In this case, the wash water may be bypassed from the filter cap 233cc of the auxiliary filter 200cc, the filter cap 333cc of the membrane filter 300cc, and the filter cap 433cc of the post-treatment filter 400cc in turn. That is, the wash water may be bypassed from the filter cap 233cc of the auxiliary filter 200cc, travel along the second connection flow path 12 to the filter cap 333c of the membrane filter 300cc, bypassed from the filter cap 333cc of the membrane filter 300cc, and then bypassed from the filter cap 433cc of the post-treatment filter 400c. The wash water bypassed from the post-treatment filter 400cc may flow into the interior of the storage tank 700 along the outlet flow path 20, allowing sterilization of the interior of the storage tank 700 to be performed.

The water purifier 1D may further include a pump 810 connected to the storage tank 700 via a first connector 811 to pump water to increase water pressure, a heater module 820 connected to the pump 810 via a second connector 821 to heat water to produce hot water, and a chilled water generation module 830 connected to the pump 810 via a third connector 831 to cool water to produce cold water.

The pump 810 may be connected on one side to a first connector 811 and on the other side to a first outlet pipe 812, the heater module 820 may be connected on one side to a second connector 821 and on the other side to a second outlet pipe 822, and the coolant generation module 830 may be connected on one side to a third connector 831 and on the other side to a third outlet pipe 832.

Each of the first outlet pipe 812, the second outlet pipe 822, and the third outlet pipe 823 may allow the washing water to be discharged to the outside via the outlet 840.

As described above, the washing water may be bypassed from the auxiliary filter 200 cc, the membrane filter 300 cc, and the post-treatment filter 400 cc in turn to sterilize the storage tank 700, and then discharged from the storage tank 700 to perform a sterilization mode to sterilize each of the first connector 811, the second connector 821, and the third connector 831, and each of the first outlet pipe 812, the second outlet pipe 822, and the third outlet pipe 832.

The scope of the invention is not limited to the specific embodiments described. Various other embodiments that can be modified or adapted by one of ordinary skill in the art without departing from the technical idea of the invention as set forth in the claims will be deemed to fall within the scope of the invention.

What is claimed is:

1. A water purifier comprising:
a pre-treatment filter connectable to an inlet flow path to allow water to be introduced from an outside of the water purifier and pre-treat the water while the pre-treatment filter is connected to the inlet flow path;
an auxiliary filter including a filter cap and a filter body, which includes an ion exchange resin that removes ions contained in the water introduced through the inlet flow path, the auxiliary filter being connectable to a first connection flow path so that water discharged from the pre-treatment filter is introduced through the first connection flow path while the auxiliary filter is connected to the first connection flow path;
a membrane filter including a filter cap and a filter body to filter out foreign substances contained in the water that has passed through the auxiliary filter, the membrane filter being connectable to a second connection flow path so that water discharged from the auxiliary filter is introduced through the second connection flow path while the membrane filter is connected to the second connection flow path;
a post-treatment filter including a filter cap and a filter body to perform a post-treatment on the water that has passed through the membrane filter, the post-treatment filter being connectable to a third connection flow path so that water discharged from the membrane filter is introduced through the third connection flow path while the post-treatment filter is connected to the third connection flow path;
a branch flow path that branches off from an upstream side of the first connection flow path and merges on a downstream side of the first connection flow path;
an electrolysis module arrangeable along the branch flow path so that while the electrolysis module is arranged along the branch flow path the electrolysis module electrolyzes the water; and
an opening/closing valve arrangeable along the first connection flow path between the pre-treatment filter and the auxiliary filter so that while the opening/closing valve is arranged along the first connection flow path, water is caused to flow to the first connection flow path or the branch flow path,
wherein while the opening/closing valve closes the branch flow path, the water sequentially passes through the filter body of the auxiliary filter, the filter body of the membrane filter, and the filter body of the post-treatment filter and is output as purified water, and
wherein while the opening/closing valve opens the branch flow path, the water is discharged through the electrolysis module passing through at least the filter cap of the auxiliary filter or the filter cap of the membrane filter without passing through at least the filter body of the auxiliary filter or the filter body of the membrane filter.

2. The water purifier according to claim 1, wherein the filter cap of the auxiliary filter is arranged to prevent the water from bypassing, and the filter cap of the membrane filter is arranged to allow the water to bypass, and
the water introduced into the auxiliary filter bypasses through the filter cap of the membrane filter after regenerating the filter body of the auxiliary filter.

3. The water purifier according to claim 2, wherein the filter cap of the auxiliary filter includes an inlet pipe connected to the first connection flow path and an outlet pipe connected to the second connection flow path, and
the filter cap of the membrane filter includes an inlet pipe connected to the second connection flow path, an outlet pipe connected to the third connection flow path, a bridge pipe connected the inlet pipe and the outlet pipe so that the water bypasses, and a drain pipe from which the water is discharged.

4. The water purifier according to claim 1, wherein the water purifier further comprises a wastewater flow path connectable to the filter cap of the membrane filter to discharge the water to the outside of the water purifier.

5. The water purifier according to claim 4, wherein the filter cap of the auxiliary filter is arranged to allow the water to bypass, and the filter cap of the membrane filter is arranged to prevent the water from bypassing, and
the water introduced into the auxiliary filter bypasses through the filter cap of the auxiliary filter and sterilizes the wastewater flow path while the wastewater flow path is connected to the filter cap of the membrane filter.

6. The water purifier according to claim 5, wherein the filter cap of the auxiliary filter includes an inlet pipe connectable to the first connection flow path and a bypass pipe connectable to the inlet pipe and the second connection flow path for the water to bypass and move to the membrane filter, and
the filter cap of the membrane filter includes an inlet pipe connectable to the second connection flow path, an outlet pipe connectable to the third connection flow path, and a drain pipe through which the water is discharged.

7. The water purifier according to claim 5, wherein the opening/closing valve is a first opening/closing valve and the water purifier further comprises:
an outlet flow path connectable to the post-treatment filter;
a second opening/closing valve arrangeable on the outlet flow path to open and close the outlet flow path; and
a third opening/closing valve arrangeable on the wastewater flow path to open and close the wastewater flow path.

8. The water purifier according to claim 7, wherein the second opening/closing valve opens the outlet flow path when the first opening/closing valve closes the branch flow path, and the second opening/closing valve closes the outlet flow path so that the water is discharged through the wastewater flow path when the first opening/closing valve opens the branch flow path.

9. The water purifier according to claim 1, wherein the filter cap of the auxiliary filter, the filter cap of the membrane filter, and the filter cap of the post-treatment filter are arranged to allow the water to bypass.

10. The water purifier according to claim 9, wherein the opening/closing valve is a first opening/closing valve and the water purifier further comprises:
   an outlet flow path connected to the post-treatment filter; and
   a second opening/closing valve arranged to open and close the outlet flow path on the outlet flow path.

11. The water purifier according to claim 10, wherein the second opening/closing valve opens the outlet flow path when the first opening/closing valve opens the branch flow path.

12. The water purifier according to claim 11, further comprising a storage tank that is connectable to the outlet flow path and arranged to hold water flowing along the outlet flow path,
   wherein the water sequentially bypassing the filter cap of the auxiliary filter, the filter cap of the membrane filter, and the filter cap of the post-treatment filter sterilizes the storage tank.

13. The water purifier according to claim 12, further comprising:
   a pump including one side connectable to the storage tank via a first connection pipe and another side connectable to a first outlet pipe to discharge water, the pump to pump the water to increase a water pressure;
   a heater module having one side connectable to the pump via a second connection pipe and another side connectable to a second outlet pipe to discharge water, the heater module to heat the water to produce hot water; and
   a cooling water generation module having one side connectable to the pump through a third connection pipe and another side connectable to a third outlet pipe to discharge water, the cooling water generation module to cool the water to produce cold water.

14. The water purifier according to claim 13, wherein
the water that has sterilized the storage tank is discharged from the storage tank to sterilize the first connection pipe, the second connection pipe and the third connection pipe and the first outlet pipe, the second outlet pipe and the third outlet pipe.

15. The water purifier according to claim 1, further comprising:
   a total dissolved solid (TDS) sensor arrangeable along the inlet flow path to measure an amount of TDS contained in the water introduced through the inlet flow path; and
   a main processor that causes the opening/closing valve to open the branch flow path based on a value measured by the TDS sensor.

* * * * *